United States Patent

James et al.

Patent Number: 5,845,145
Date of Patent: Dec. 1, 1998

[54] SYSTEM FOR GENERATING AND SENDING A CRITICAL-WORLD-FIRST DATA RESPONSE PACKET BY CREATING RESPONSE PACKET HAVING DATA ORDERED IN THE ORDER BEST MATCHING THE DESIRED ORDER

[75] Inventors: David V. James, Palo Alto; Donald N. North, Saratoga; Glen D. Stone, San Jose, all of Calif.

[73] Assignee: Apple Computer, Inc., Cupertino, Calif.

[21] Appl. No.: 576,295

[22] Filed: Dec. 21, 1995

[51] Int. Cl.[6] ............................................. G06F 3/00
[52] U.S. Cl. ................................... 395/821; 395/885
[58] Field of Search ...................... 340/825.08; 370/455; 371/40.14; 395/310, 842, 821, 885; 711/117; 365/149

[56] References Cited

U.S. PATENT DOCUMENTS

| | | | |
|---|---|---|---|
| 4,779,193 | 10/1988 | Koga et al. | 365/149 |
| 5,166,675 | 11/1992 | Amemiya et al. | 340/825.08 |
| 5,168,561 | 12/1992 | Vo | 395/842 |
| 5,357,622 | 10/1994 | Parks et al. | 711/117 |
| 5,388,229 | 2/1995 | Hyoiga et al. | 395/310 |
| 5,459,742 | 10/1995 | Cassidy et al. | 371/40.14 |
| 5,535,214 | 7/1996 | Shibara | 370/455 |

*Primary Examiner*—Thomas C. Lee
*Assistant Examiner*—David Ton
*Attorney, Agent, or Firm*—Fenwick & West LLP; Mark A. Aaker

[57] ABSTRACT

A system for efficiently supporting critical-word-first data transfers comprises a data storage device, a controller, a data selector, and a multiplexer. The data storage device is preferably capable of outputting data in one or more word orderings. The controller is preferably a state machine that processes data transfer requests by determining the orderings of data that the associated data storage device, data selector and multiplexer can provide, determining the ordering for the data requested and creating a response packet with the data ordered in critical-word-aligned order beginning with the word containing the requested address. The present invention also includes a method for efficiently supporting critical-word-first data transfers. The method includes the steps of: monitoring the bus for a data request packet; determining the desired order for the requested data; determining the transmission orders in which the data storage device can provide the data; determining the transmission order best matching the requested order and creating a response packet with the data ordered in the order best matching the desired requested order; adding response format information to the header of the response packet and transmitting the response packet on the bus.

13 Claims, 11 Drawing Sheets

| data00 | data01 | data02 | data03 | data04 | data05 | data06 | data07 |
|--------|--------|--------|--------|--------|--------|--------|--------|
| data08 | data09 | data10 | data11 | data12 | data13 | data14 | data15 |
| data16 | data17 | data18 | data19 | data20 | data21 | data22 | data23 |
| data24 | data25 | data26 | data27 | data28 | data29 | data30 | data31 |
| data32 | data33 | data34 | data35 | data36 | data37 | data38 | data39 |
| data40 | data41 | data42 | data43 | data44 | data45 | data46 | data47 |
| data48 | data49 | data50 | data51 | data52 | data53 | data54 | data55 |
| data56 | data57 | data58 | data59 | data60 | data61 | data62 | data63 |

| cmd | responder | tId | requester | critical word first | | 28 | |
|-----|-----------|-----|-----------|---------------------|---|----|---|
| data28 | data29 | data30 | data31 | data32 | data33 | data34 | data35 |
| data36 | data37 | data38 | data39 | data40 | data41 | data42 | data43 |
| data44 | data45 | data46 | data47 | data48 | data49 | data50 | data51 |
| data52 | data53 | data54 | data55 | data56 | data57 | data58 | data59 |
| data60 | data61 | data62 | data63 | data00 | data01 | data02 | data03 |
| data04 | data05 | data06 | data07 | data08 | data09 | data10 | data11 |
| data12 | data13 | data14 | data15 | data16 | data17 | data18 | data19 |
| data20 | data21 | data22 | data23 | data24 | data25 | data26 | data27 |

| data00 | data01 | data02 | data03 | data04 | data05 | data06 | data07 |
|---|---|---|---|---|---|---|---|
| data08 | data09 | data10 | data11 | data12 | data13 | data14 | data15 |
| data16 | data17 | data18 | data19 | data20 | data21 | data22 | data23 |
| data24 | data25 | data26 | data27 | data28 | data29 | data30 | data31 |
| data32 | data33 | data34 | data35 | data36 | data37 | data38 | data39 |
| data40 | data41 | data42 | data43 | data44 | data45 | data46 | data47 |
| data48 | data49 | data50 | data51 | data52 | data53 | data54 | data55 |
| data56 | data57 | data58 | data59 | data60 | data61 | data62 | data63 |

| cmd | responder | tId | requester | critical word first | | | 28 |
|---|---|---|---|---|---|---|---|
| data28 | data29 | data30 | data31 | data32 | data33 | data34 | data35 |
| data36 | data37 | data38 | data39 | data40 | data41 | data42 | data43 |
| data44 | data45 | data46 | data47 | data48 | data49 | data50 | data51 |
| data52 | data53 | data54 | data55 | data56 | data57 | data58 | data59 |
| data60 | data61 | data62 | data63 | data00 | data01 | data02 | data03 |
| data04 | data05 | data06 | data07 | data08 | data09 | data10 | data11 |
| data12 | data13 | data14 | data15 | data16 | data17 | data18 | data19 |
| data20 | data21 | data22 | data23 | data24 | data25 | data26 | data27 |

~100

| cmd | responder | tId | requester |
|---|---|---|---|
| critical word first | | | 28 |
| data28 | data29 | data30 | data31 |
| data32 | data33 | data34 | data35 |
| data36 | data37 | data38 | data39 |
| data40 | data41 | data42 | data43 |
| data44 | data45 | data46 | data47 |
| data48 | data49 | data50 | data51 |
| data52 | data53 | data54 | data55 |
| data56 | data57 | data58 | data59 |
| data60 | data61 | data62 | data63 |
| data00 | data01 | data02 | data03 |
| data04 | data05 | data06 | data07 |
| data08 | data09 | data10 | data11 |
| data12 | data13 | data14 | data15 |
| data16 | data17 | data18 | data19 |
| data20 | data21 | data22 | data23 |
| data24 | data25 | data26 | data27 |

| data00 | data01 | data02 | data03 | data04 | data05 | data06 | data07 |
| --- | --- | --- | --- | --- | --- | --- | --- |
| data08 | data09 | data10 | data11 | data12 | data13 | data14 | data15 |
| data16 | data17 | data18 | data19 | data20 | data21 | data22 | data23 |
| data24 | data25 | data26 | data27 | data28 | data29 | data30 | data31 |
| data32 | data33 | data34 | data35 | data36 | data37 | data38 | data39 |
| data40 | data41 | data42 | data43 | data44 | data45 | data46 | data47 |
| data48 | data49 | data50 | data51 | data52 | data53 | data54 | data55 |
| data56 | data57 | data58 | data59 | data60 | data61 | data62 | data63 |

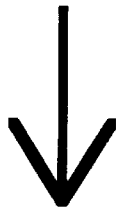

| cmd | responder | tId | requester | critical word first | | 24 | |
| --- | --- | --- | --- | --- | --- | --- | --- |
| data24 | data25 | data26 | data27 | data28 | data29 | data30 | data31 |
| data32 | data33 | data34 | data35 | data36 | data37 | data38 | data39 |
| data40 | data41 | data42 | data43 | data44 | data45 | data46 | data47 |
| data48 | data49 | data50 | data51 | data52 | data53 | data54 | data55 |
| data56 | data57 | data58 | data59 | data60 | data61 | data62 | data63 |
| data00 | data01 | data02 | data03 | data04 | data05 | data06 | data07 |
| data08 | data09 | data10 | data11 | data12 | data13 | data14 | data15 |
| data16 | data17 | data18 | data19 | data20 | data21 | data22 | data23 |

| data00 | data01 | data02 | data03 | data04 | data05 | data06 | data07 |
|--------|--------|--------|--------|--------|--------|--------|--------|
| data08 | data09 | data10 | data11 | data12 | data13 | data14 | data15 |
| data16 | data17 | data18 | data19 | data20 | data21 | data22 | data23 |
| data24 | data25 | data26 | data27 | data28 | data29 | data30 | data31 |
| data32 | data33 | data34 | data35 | data36 | data37 | data38 | data39 |
| data40 | data41 | data42 | data43 | data44 | data45 | data46 | data47 |
| data48 | data49 | data50 | data51 | data52 | data53 | data54 | data55 |
| data56 | data57 | data58 | data59 | data60 | data61 | data62 | data63 |

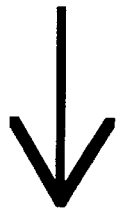

| cmd | responder | tId | requester | critical word first | | | 16 |
|-----|-----------|-----|-----------|---------------------|--|--|----|
| data16 | data17 | data18 | data19 | data20 | data21 | data22 | data23 |
| data24 | data25 | data26 | data27 | data28 | data29 | data30 | data31 |
| data32 | data33 | data34 | data35 | data36 | data37 | data38 | data39 |
| data40 | data41 | data42 | data43 | data44 | data45 | data46 | data47 |
| data48 | data49 | data50 | data51 | data52 | data53 | data54 | data55 |
| data56 | data57 | data58 | data59 | data60 | data61 | data62 | data63 |
| data00 | data01 | data02 | data03 | data04 | data05 | data06 | data07 |
| data08 | data09 | data10 | data11 | data12 | data13 | data14 | data15 |

SYSTEM FOR GENERATING AND SENDING A CRITICAL-WORLD-FIRST DATA RESPONSE PACKET BY CREATING RESPONSE PACKET HAVING DATA ORDERED IN THE ORDER BEST MATCHING THE DESIRED ORDER

BACKGROUND OF THE INVENTION

1. Field of the Invention

The present invention relates generally to data transfers in computer systems. In particular, the present invention relates to a system and method for reading and writing data between processors, bridges and memories that efficiently provides for critical-word-first data transfers.

2. Description of the Background Art

The use of multiple processors is a recent trend in computer design. Each processor in a multi-processor system may work on a separate portion of a problem, or work on different problems, simultaneously. The processors used in the multi-processor architectures can be coupled to the same buses, however, in multi-processor architectures several busses are often employed with a plurality of processors attached to each bus. The buses are in turn connected together by bridges that transfer data from one bus to the other an vice versa. The bridges vary significantly in complexity, and can provide for the complete reformatting of data passing through the bridge or do little more that temporarily buffer the data. Moreover, it is common for the processors to share memories which may be attached to any one or several of the busses in such a multi-processor environment.

Because of the configuration just described, data transfers from memory to the processors, from processor to processor, or from bridge to processor are a common event. Moreover, since the processors in multi-processor environments frequently have caches that need to be updated and refreshed, data transfers in a variety of block sizes are common occurrences. Thus, those skilled in the art will realize that a majority of the bandwidth of the bus is utilized servicing data transfer requests.

In order to increase the computational efficiency of such multi-processor systems, some prior art buses provide for critical-word-first data transfers. Such critical-word-first data transfers are performed by sending data in a re-formatted condition such that the first word of interest to the processor requesting the data is the first word in the block of data being transferred. This allows the processor requesting the data to begin processing as soon as the first word or portion of the data transfer has been received, thereby eliminating the need to delay processing until the entire data transfer has been completed. For example, if a processor has requested a 64-byte block of data and needs to process the 12th word (which begins with the 48th byte, each word being four bytes) in the block, a critical-word-first data transfer would provide the word containing the 48th byte of data in the block first and then successive words until the end of the block is reached, then the first through 11th words (ending with the 47th byte) of data in the block would be transferred. Thus, as soon as the 48th byte in the block has been received, the processor can begin operation without having to wait until all 64 bytes have been received.

A particular problem associated with the use of such critical-word-first data transfers is that they result in the creation of data bottlenecks. For example, consider a system having a first bus and a second bus connected by a bridge where the first bus provides for critical-word-first data transfers and the second bus does not. Any such critical-word-first data transfers that request the data from the second data bus require that the bridge reformat the data, thus adding delay to the data transfer. One prior art approach has been to have the bridge perform the reformatting of the data since the memories and other devices connected to the second bus cannot provide the data in critical-word-first order. However, this approach is inadequate because the additional processing of the data required to reformat the data into critical-word-first order often turns the bridge into a data bottle neck each time a critical-word-first transfer occurs, thereby preventing other data transfers across the bridge. Furthermore, having the bridge reformat the data is problematic because it requires that the bridge provide additional buffer space so the data being transferred can be re-ordered. Also, requiring the bridge to perform reordering prevents cheaper and faster hardware from being used such as FIFO buffers. Thus, there is a need for a system and method for efficiently handling such critical-word-first data transfers.

Dynamic bus sizing is also known in the prior art. Dynamic bus sizing allows a requesting processor to specify a requested data width for the data transfer, and the acknowledgment signal to the request permits the responder to specify the data width supported by the responder and in which the data transfer will occur. Such buses that support dynamic bus sizing, like SBus, are unable to address the ordering of data, and therefore, do not provide a solution to the critical-word-first data transfers and their associated problems.

Thus, there is a continuing need for a system and method for capable of processing critical-word-first data transfers in an efficient manner. This system and method should not require modifications to other devices of a computer system.

SUMMARY OF THE INVENTION

The present invention overcomes the deficiencies and limitations of the prior art with a system and method for efficiently supporting critical-word-first data transfers in a multi-processor computer system. The present invention advantageously eliminates the delays in reordering the data within a bridge by providing a system that returns data in critical-word-aligned order. The present invention advantageously provides a packet request format that allows identification of the critical byte, and a novel packet response format that provides for a data transfer where the data is returned in memory word-aligned order with the critical byte in the first word of the response packet.

The system comprises a data storage device, a controller, a data selector, and a multiplexer. The data storage device comprises a plurality of memory lines, each memory line having an unique address. A memory line comprises multiple bytes. A word is the convenient addressable unit within the memory line, which would typically be 32 bits or larger power of 2. The data storage device is preferably capable of outputting data in one or more word orderings. The controller is preferably a state machine that processes data transfer requests by determining the orderings of data that the associated data storage device, data selector and multiplexer can provide; determining the ordering for the data requested; and creating a response packet with the data ordered in critical-word-aligned order beginning with the word containing the requested address.

The present invention includes a method for efficiently supporting critical-word-first data transfers. The method includes the steps of: monitoring the bus for a data request packet; determining the desired order for the requested data; determining the transmission orders in which the data storage device can provide the data; determining the transmission order best matching the requested order and creating a response packet with the data ordered in the order best matching the desired requested order; adding response format information to the header of the response packet and transmitting the response packet on the bus.

BRIEF DESCRIPTION OF THE DRAWINGS

FIGS. 8A, 8B, 8C, and 8D are charts showing the exemplary data as store in the data storage device and several of the corresponding data transfer responses created by different memory controllers constructed according to the present invention.

DETAILED DESCRIPTION OF THE PREFERRED EMBODIMENTS

Figure 1:
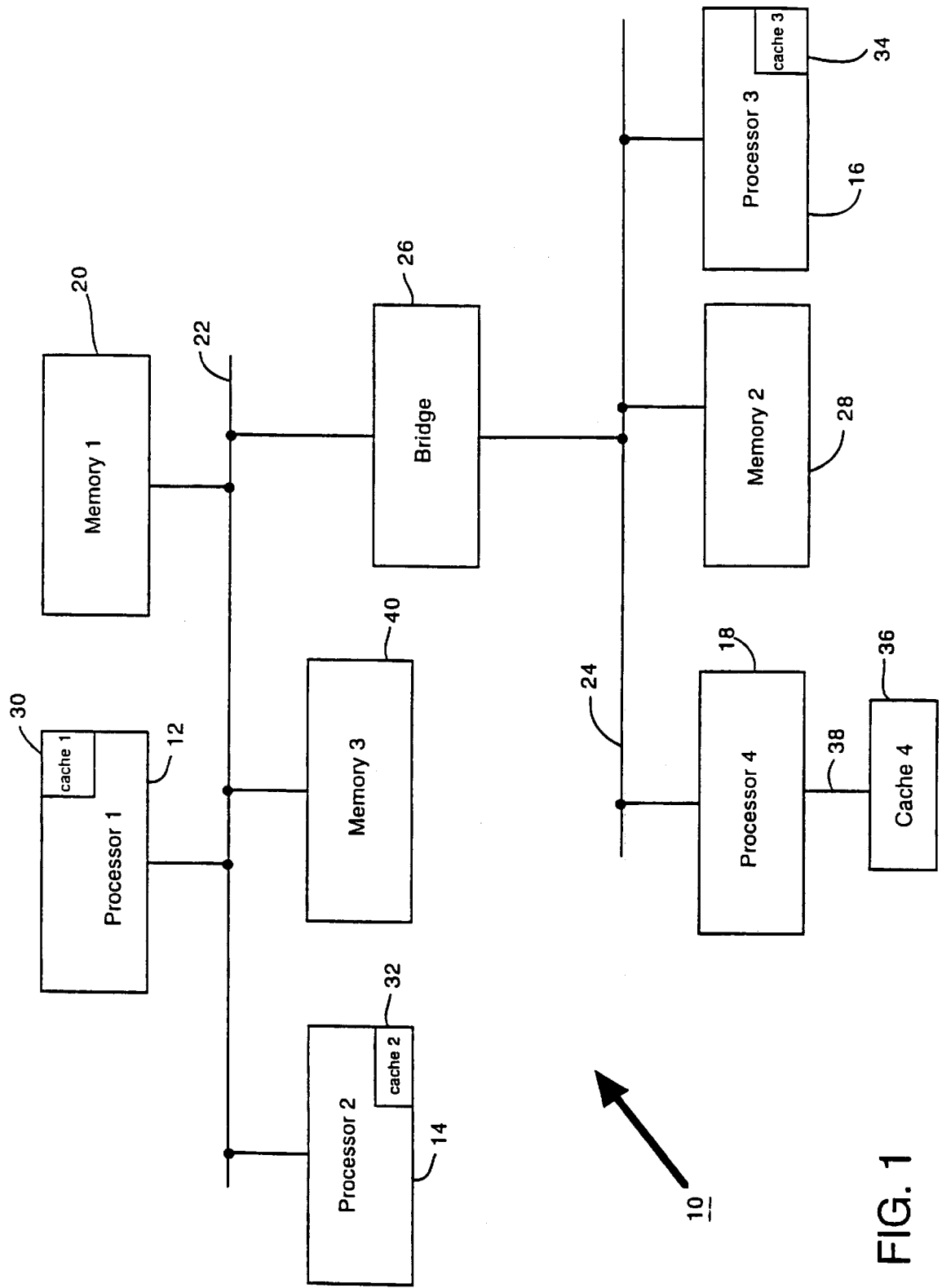
FIG. 1 is a block diagram of an exemplary multi-processor, multi-bus computer system.

Referring now to FIG. 1, a block diagram of a computer system 10 is shown. While the system 10 will now be described with reference to a four processor multi-processing system 10, those skilled in the art will realize that the present invention applies to any system having a plurality of processors. The computer system 10 comprises a first processor 12, a second processor 14, a third processor 16, a fourth processor 18, a first memory 20, a second memory 28, a third memory 40 and a bridge 26. The first processor 12, second processor 14, first memory 20 and third memory 40 are coupled by a first bus 22; and the third processor 16, fourth processor 18 and the second memory 28 are coupled by a second bus 24. The first bus 22 and the second bus 24 are coupled by the bridge 26.

In an exemplary embodiment, the processors 12, 14, 16, 18 are PowerPC processors from Motorola Corporation of Schaumberg, Ill. The processors 12, 14, 16, 18 may alternately be Alpha Processors from the Digital Equipment Corporation of Maynard, Mass. or any other microprocessors capable of being used in a multi-processor computer system. The first processor 12, second processor 14, and third processor 16 each has an integrated cache 30, 32, and 34, respectively. An integrated cache 30, 32, 34 is a group of memory cells that are integrated into the same circuit or chip as the processor 12, 14, and 16. The fourth processor 18 has an off chip cache 36. The off chip cache 36 is integrated in a separate circuit and is coupled to the fourth processor 18 by a signal line 38. Each cache 30, 32, 34, 36 holds data for its processor 12, 14, 16, 18. Each processor 12, 14, 16, 18 can generally access data in its cache 30, 32, 34, 36 faster than it can access data in the memory 20. Furthermore, by accessing data in its cache 30, 32, 34, 36, a processor 12, 14, 16, 18 does not utilize the bus 22, 24. Thus, leaving the bus 22, 24 free for use by other devices.

Figure 2:
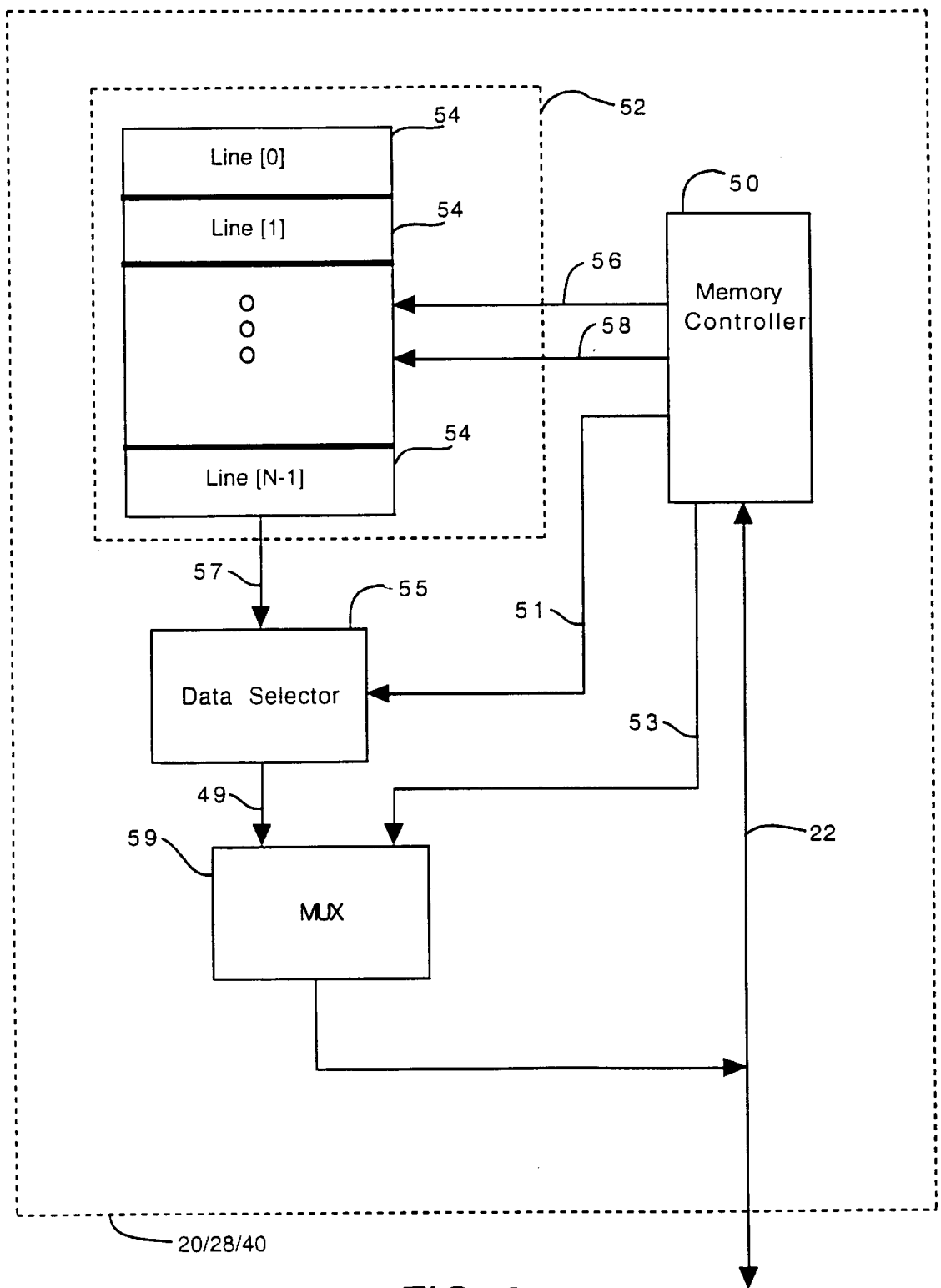
FIG. 2 is a block diagram of a memory constructed according to the present invention.

The first and third memories 20, 40 comprise random access memory ("RAM"). The first and third memories 20, 40 hold data and program instruction steps for the processors 12, 14, 16, 18. The second memory 28 is preferably also random access memory as the first memory 20 only the second memory 28 is coupled to the second bus 24. Referring now to FIG. 2, a block diagram of a preferred embodiment for the memories 20, 28, 40 constructed in accordance with the present invention is shown. Each memory 20, 28, 40 comprises a memory controller 50, a data storage device 52, a data selector 55 and a multiplexer 59.

The data storage device 52 is preferably a dynamic random access memory and comprises a plurality of memory lines 54. Each memory line 54 has an address where N is the number of memory lines in data storage device 52. When accessing a memory line containing M bytes, the byte address used on bus 22 is N times M plus K (N*M+K), where N is the memory line number, M is the number of bytes in the memory line and a power of two, and K is the byte offset within line N. Each memory line 54 stores data or other codes and may be of various sizes. For example, a particular data storage device 52 might provide lines 64-byte in size. While the lines will be assumed to be of a 64-byte size, those skilled in the art will realize that the line size may be a variety of other sizes. The data storage device 52 has a first and a second address inputs and a data output. The first and second address inputs are coupled to receive address and control signals from the memory controller 50, and the data output of the data storage device 52 is coupled to the data selector 55.

The memory controller 50 controls the operation of the memory 20, 28, 40 and is coupled to the data storage device 52 by a signal line 56 and a signal line 58. The memory controller 50 is also coupled to the bus 22, 24 (bus 22 for the controller in memory 20, 40 and bus 24 for the controller in memory 28). The memory controller 50 preferably includes combinational logic and data storage circuits such as flip-flops. The functionality included in the memory controller 50 includes logic for decoding commands and responding to the commands such as various forms of read and write commands. The memory controller 50 of the present invention also includes combinational logic for processing data transfer request packets and creating and sending data transfer response packets as will be described below with reference to FIG. 6. The memory controller 50 also can include logic for maintaining cache tags and other status information in a conventional manner. The memory controller 50 has an line address output coupled to the first address input of the data storage device 52 by signal line 56. The memory controller 50 also has an offset address output coupled to the second address input of the data storage device 52 by signal line 58. The memory controller 50 has a first control output coupled to the data selector 55 by signal line 51 to control the ordering and size of the data output to bus 22. Finally, the memory controller 50 has a data output coupled to the multiplexer 59 by signal line 53 for outputting a response header information. The memory controller 50 is also coupled to control multiplexer 59 in a conventional manner. Using the control and data outputs just described, the memory controller 50 is able to process data transfer request packets and create and send data response packets as will be described below with reference to FIGS. 4A and 4B.

Each memory 20, 28, 40 also includes the data selector 55 having a data input, a data output and a control input. The data input of the data selector 55 is coupled to the data output of the data storage device 52 by signal line 57 and the data selector 55 receives a block at a time or an entire memory line 54 of data. The data selector 55 has a control input coupled to memory controller 50 by signal line 51. In response to control signals received from the memory controller 50, the data selector 55 outputs the data in word sizes specified by the controller 50. The word sizes are predefined by the manufacturer when each memory 20, 28, 40 is constructed taking into consideration, the number of bytes in a memory line 54, the memory block size, the size of the data bus (the data beat) and preferred wording sizes. Generally, each memory line is expected to be larger than the bus beat so that multiple bus beats are required to transfer a memory line from a responder (memory) to a requester (processor). The present invention advantageously ensures that any response including requested data will have the requested byte within the first word of data in the response packet. For example, as will be described below with reference to FIGS. 8A, 8C and 8D, different memories 20, 28, 40 can be able to output different word sizes, and therefore, the data selector 55 of the first memory 20 may provide a word size of eight bytes (octlet); the data selector 55 of the second memory 28 may provide a word size of sixteen bytes (hexlet); and the data selector 55 of the third memory 20 may provide a word size of four bytes (quadlet). The data selector 55 is preferably constructed from buffers and switches such as crossbar switches and multiplexers, as well as other combinational logic for control as will be recognized by those skilled in the art. The output of the data selector is coupled to signal line 49 to provide the word size of the memory 20, 28, 40.

The final element of the memory 20, 28, 40 is the multiplexer 59. The multiplexer 59 has a first data input, a second data input, a data output, and a control input (not shown). The multiplexer 59 is coupled to and controlled by the memory controller 50 to create the data response packets transferred over bus 22, 24. The first data input of the multiplexer 59 is coupled to signal line 49 and thus, the output of the data selector 55 to receive the data portion of the response packet. The second data input of the multiplexer 59 is coupled by signal line 53 to the data output of the memory controller 50 to receive a header portion of the response packet which specifies the command, the recipient and other information regarding the data in the response packet. The output of the multiplexer 59 is coupled to the bus 22, 24. Thus, in response to the control signal from the memory controller 50, the multiplexer 59 either outputs the header or the data of the response packet.

Referring back to FIG. 1, the bridge 26 is an interface between interconnects similar to the IEEE Std 1596 Scalable Coherent Interface. The bridge 26 does not transmit memory access commands for which it is not in the transfer path. For example, the bridge 26 would transfer memory access commands from the third processor 16 or the fourth processor 18 to the first memory 20 since the path between processors 16 and 18 and memory 20 is through the bridge 26. The bridge 26, however, would not transmit memory access commands from the first processor 12 or second processor 14 to the first memory 20 since the bridge 26 is not in the path between these processors 12, 14 and the memory 20.

Figure 3:
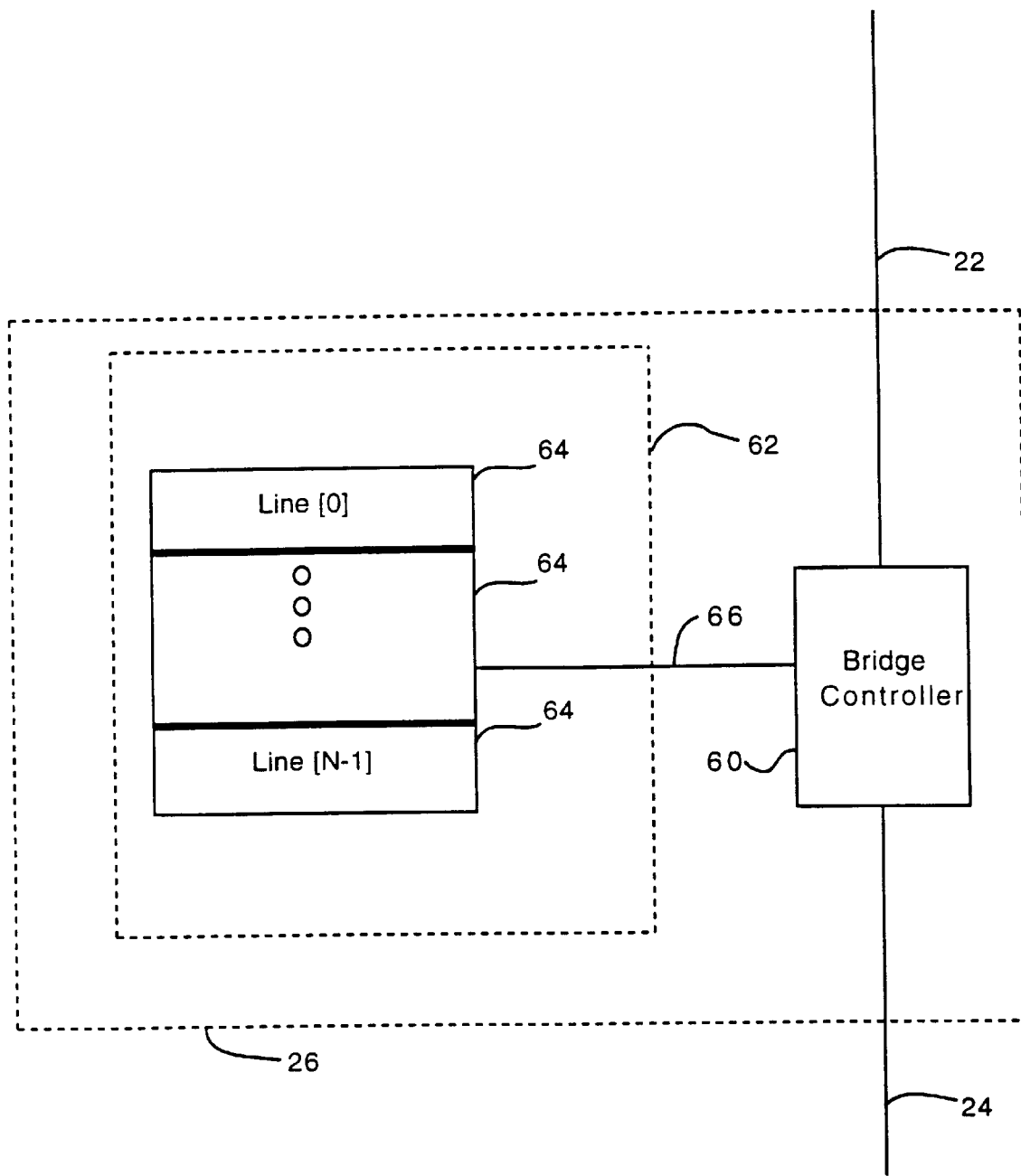
FIG. 3 is a block diagram of a bridge constructed according to the present invention.

Referring now to FIG. 3, a preferred embodiment of the bridge 26 is shown in more detail. The bridge 26 preferably comprises a bridge controller 60 and a data storage buffer 62. Unlike the storage device 52 of the memory 20, the data storage buffer 62 is preferably static random access memory and comprises a plurality of transaction buffers, each one of which is sufficient in size to hold a request or response. In an exemplary embodiment, the transaction buffers are FIFO buffers capable of holding two or more lines of memory. The data storage buffer 62 is also able to output the data in words of various sizes and various orderings, and is coupled to the bridge controller 60 by signal line 66. The bridge controller 60 is also coupled to the first bus 22 and the second bus 24 as shown for sending and receiving data on either bus 22, 24. The bridge controller 60 controls the passage of data from the first bus 22 to the second bus 24. The bridge controller 60 operates in a manner similar to the memory controller 50 to respond and service data transfer requests including read and write operations that are between devices attached to remote buses 22, 24. The bridge controller 60 does so by receiving data on a first bus, determining whether the second bus is busy, and transmitting the data on the second bus if is not busy, otherwise storing the data in FIFO order in the data storage buffer 62 and then transmitting the data on the second bus as soon as it becomes available. The bridge controller 60 preferably includes combinational logic and data storage circuits such as flip-flops for operation with interconnects similar to IEEE Std 1596 Scalable Coherent Interfaces, as will be understood by those skilled in the art. The functionality included in the bridge controller 60 includes logic for decoding commands and responding to the commands such as various forms of read and write commands. The functionality included in the bridge controller 60 is similar to that included in the memory controller 50 for processing data transfer request packets and creating and sending data transfer response packets as will be described below with reference to FIG. 6. In particular, the bridge controller 60 includes combinational logic or its equivalent for responding to critical-byte-first requests with responses having the data ordered in critical-word-first order, where the word size is determined by the responding memory. In particular, where a bus such as the second bus 24 does not support the data packet structure of the present invention which is supported on the first bus 22, the bridge 26 would include logic for converting critical-byte-first requests to the standard used on the second bus 24 such as VME or NuBus, and logic for converting data responses on the second bus 24 to the response packet format of the claimed invention (i.e., adding the header information and an address offset conforming to FIG. 4B).

Figure 4A:
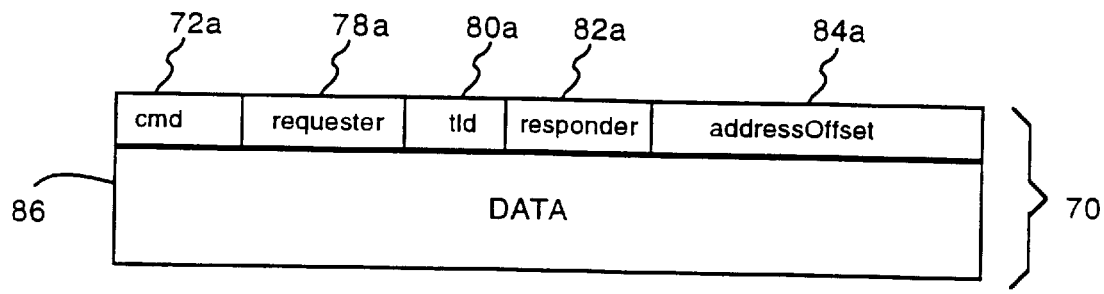
FIG. 4A is a graphical representation for the format of a send packet according to the present invention.
Figure 4B:
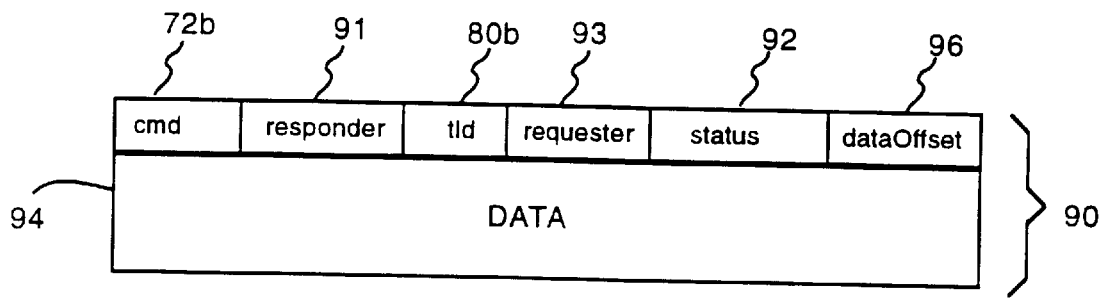
FIG. 4B is a graphical representation for the format of a response packet according to the present invention.

Referring now to FIGS. 4A and 4B, the preferred embodiments for a request packet 70 and a response packet 90 used in conjunction with the system 10 of the present invention are shown. The unique formatting of these packets 70, 90 provide the means by which the present invention is able to efficiently process critical-word-first data transfers. The present invention advantageously overcomes the shortcomings of the prior art by providing a system 10 in which critical-word-first data transfers are processed with the ordering requested if the responding device (i.e., memory or bridge) is able to provide such ordering. However, in the instances where the responding device is not able to provide the requested critical-word-first ordering, the present invention advantageously returns data in a block-aligned format beginning with the block containing the critical-first byte. The response packet 90 advantageously includes a response-status code to identify whether the data transfer is being returned in block-aligned order, and the first byte in the block. The system and method of the present invention is particularly advantageous because it reduces the complexity of the memory and bridge designs and is able to process data requests regardless of the preferred word sizes used by memory 20, 28, 40 and the processors 12, 14, 16, 18. The claimed invention also eliminates any need to re-order the data such as is common for bridges of the prior art.

As shown in FIG. 4A, the request packet 70 preferably provides a header having a plurality of fields 72a, 78a, 80a, 82a, and 84a; and a data block 86. The header preferably includes a command field 72a that identifies the data transfer operation being performed such as read, write, invalidate cache line, etc. The value in the command field 72a specifies how the request packet's data is to be used, the operation that is to be performed by the responder, and what the form of the response should be. A second field 78a identifies a data transaction source or requester. This is typically the processor 12, 14, 16, 18 that created and issued the request packet 70. The third field 80a preferably is used to store an unique identifier for each of the requester's outstanding requests. This is used to identify response packets such as when a requester has issued more than one request packet 70. The fourth field 82a identifies a transaction responder or device that is being addressed. Finally, a fifth field 84a stores responder-local addressing information for the data transfer being performed. Commands typically specify whether the data is being read or written and the size of the data transfer. Other similar commands will be obvious to those of ordinary skill in the art.

As shown in FIG. 4B, the response packet 90 preferably provides a similar group of fields 72b, 91, 80b, and 93, two different fields 92, 96 and a data block 94. For convenience and ease of understanding, like reference numbers have been used for like fields between the request packet 70 and the response packet 90. The response packet 90 has a similar format to the request packet 70 except that the fifth field 84a has been replaced by a status field 92 that includes status bits for specifying whether the data is being returned (or in the case of an error, could not be returned), and a dataOffset field 96 identifying which is the first byte in the data block 94. The header of the response packet 90 also stores an identifier for the responder creating the response packet in a second field 91, and an identifier for the device requesting the data transfer in a four field 93. The data stored in the status field 92 advantageously allows the device receiving the response packet 90 to determine the type of critical-word ordering in which the data is formatted.

Figure 5:
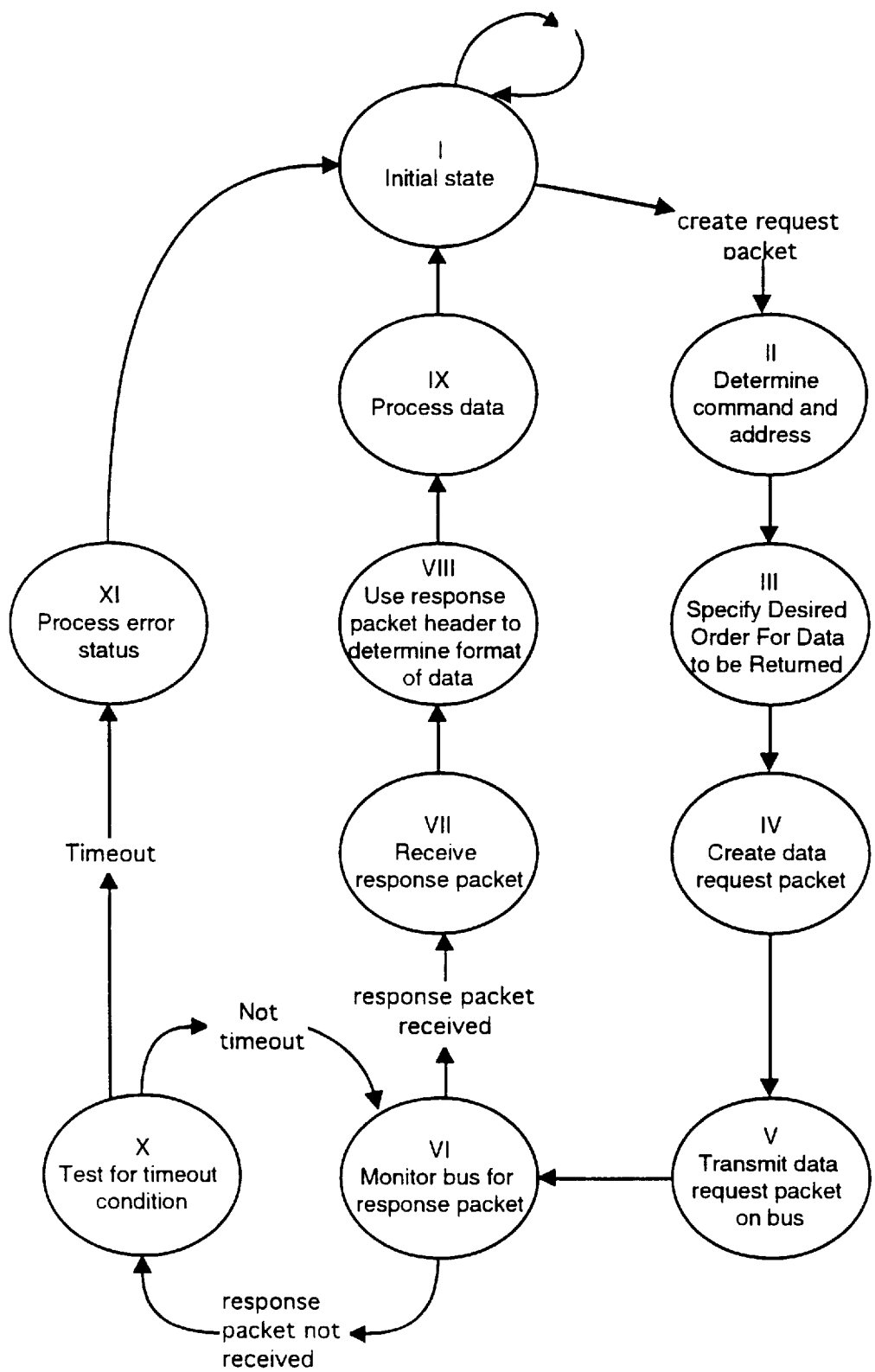
FIG. 5 is a block diagram of a state machine illustrating the operations performed by an exemplary processor or other device for generating a data request packet and processing the data transferred in response to the request.

Referring now to FIG. 5, a state diagram of the actions taken by a requester, such as a processor performing a read or write operation is shown. While the operation of the requester is shown as a state diagram, those skilled in the art will realize that the operations could be translated into a hardware state sequencer or mircocode executable by a processor and the state diagram is provided only by way of example. Those skilled in the art will realize how to construct a processor for operation according to the present invention from the inputs, outputs, and states that are described below. While the requester is assumed to be a processor, the requester could be a controller or any other device attached to the bus 22, 24 and capable of performing a data transfer operation.

The requester begins in an initial state I and remains there until a data transfer request is to be created. Upon receipt of a signal indicating a request packet 70 is to be created, the requester transition to state II where the command and address for the data transfer are determined. Next in state III, the desired order in which the requester wants the data to be returned is determined. Then in state IV, the data request packet 70 is created. This is preferably done by storing values in the header according to the determinations made in states II and III. Next in state V, the data request packet 70 is transmitted on the bus 22, 24. Then the requester transitions to state VI where the bus 22, 24 is monitored for a response packet 90 addressed to the requester and having a matching value in the third field 80b. If a response packet has not been received, or asserted on the bus 22, 24, the requester transitions to state X where it tests for a time-out condition. The requester only monitors the bus for a predetermined time after which it is considered an error if no response packet is received. When in state X, if there is no time out condition, the requester loops back to state VI for further monitoring of the bus 22, 24. However, if there is a time out condition, the requester transition to state XI to process the error status after which the requester returns to state I. Once a matching response packet 90 has been received, the requester transitions to state VII where the response packet 90 is received. Next, the requester proceeds to state VIII where the data in the header, in particular, the status field 92 is checked. The requester is able to determine the order in which the data is in and the critical first word from the status bit and the offset data stored in the information field 92. Once the data has been decoded by using the data in the information field 92, the requester continues in state IX where the data is processed as desired by the requester after which the requester returns to state I, and the exchange of request and response packets 70, 90 is complete.

Figure 6:
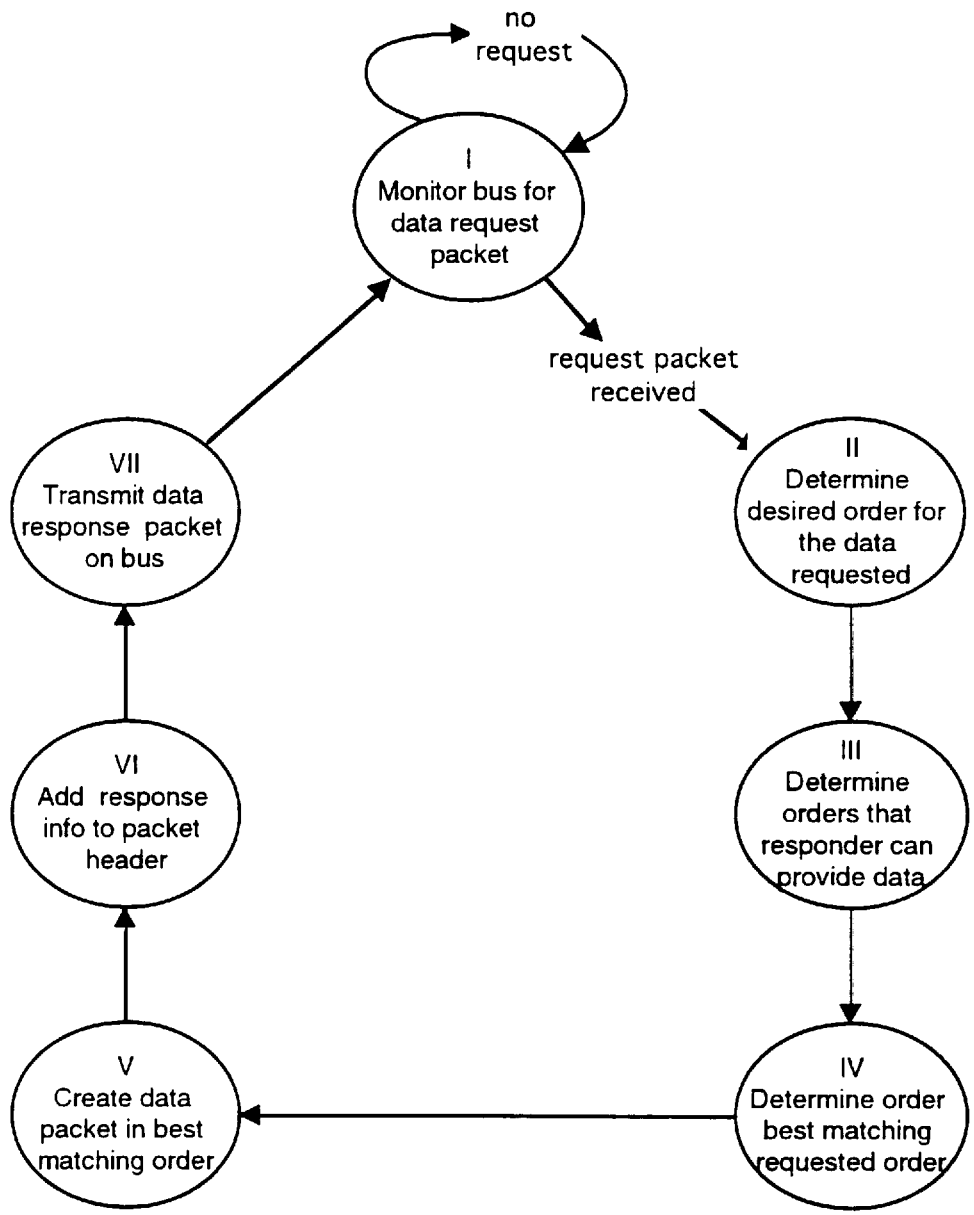
FIG. 6 is a state diagram of the states of a controller constructed according to the present invention for efficiently supporting critical-word-first data transfers.

Referring now to FIG. 6, a state diagram detailing the logic that is preferably included in the memory controllers 50 and the bridge 26 of the system 10 of the present invention. The memory controllers 50 and the bridge 26 both include a state machine that receives signals and generates signals for controlling accesses to their respective data storage 72, 92 or data being transferred from another bus. The memory controllers 50 and the bridge 26 comprises combinational logic and data storage devices to implement its functions. Those skilled in the art will realize how to construct a the memory controllers 50 and the bridge 26 from the inputs, outputs described above, and states that are described below. FIG. 6 shows the significant states of the memory controllers 50 and the bridge 26; other states may be necessary to implement fully either device. These additional states will be understood by those skilled in the art. FIG. 6 shows the significant states for processing a data request packet 70 and creating a data response packet 90.

The operation of the memory controller 50 and the bridge 26 will now be described with reference to the state diagram of FIG. 6 and a responder which is assumed to be either the memory controller 50 or the bridge 26. The responder preferably begins in an initial state I, where the responder monitors the bus 22, 24 for a data request packet 70 addressed to a portion of the data storage 52 controlled by the responder. As long as no request for data at an address controlled by responder is received, the responder remains in state I. Once a request packet 70 accessing an address controlled by responder is received, the responder transitions to state II. In state II, the responder determines the desired order in which the requester would like the data returned. Then the responder continues in state III where the responder determines the ordering formats in which the responder can provide the data. For example, the responder may be able to provide the data normal memory line of the responding device and in a word first order where the word size is 4 bytes. Next in state IV, the order in which the requester wants the data returned is compared to the ordering formats in which the responder can provide the data to determine whether the responder can provide the data in the format requested. For example, if the line size is 64 bytes, the first-critical byte is byte 30 and the word size is 4 bytes, then the best matching order will be 64 bytes ordered from byte 28 to byte 63 and from byte 0 to byte 27. The best matching order will be such that the critical byte is in the first word that the responder can provide. This determination is made according to the word size and the orderings that the responder is capable of providing. Next, in state V, the data response packet is created by first fetching the data block for field 94. Using the data and ordering the data in the order best matching the desired order requested completes the data block 94. Next in state VI, a header for the data response packet is created. This is done by creating a header using the information from the received request packet and by retrieving the data to the data block 94 as specified by the command in the received request packet. The status field 92 and the dataOffset field 96 are updated to indicate the type of word ordering and the offset, as will be discussed below with reference the examples in FIGS. 8A–8D. After state VI, the responder continues in state VII by transmitting the data response packet on the bus. Then, the transaction is complete and the responder returns to state I.

Figure 7:
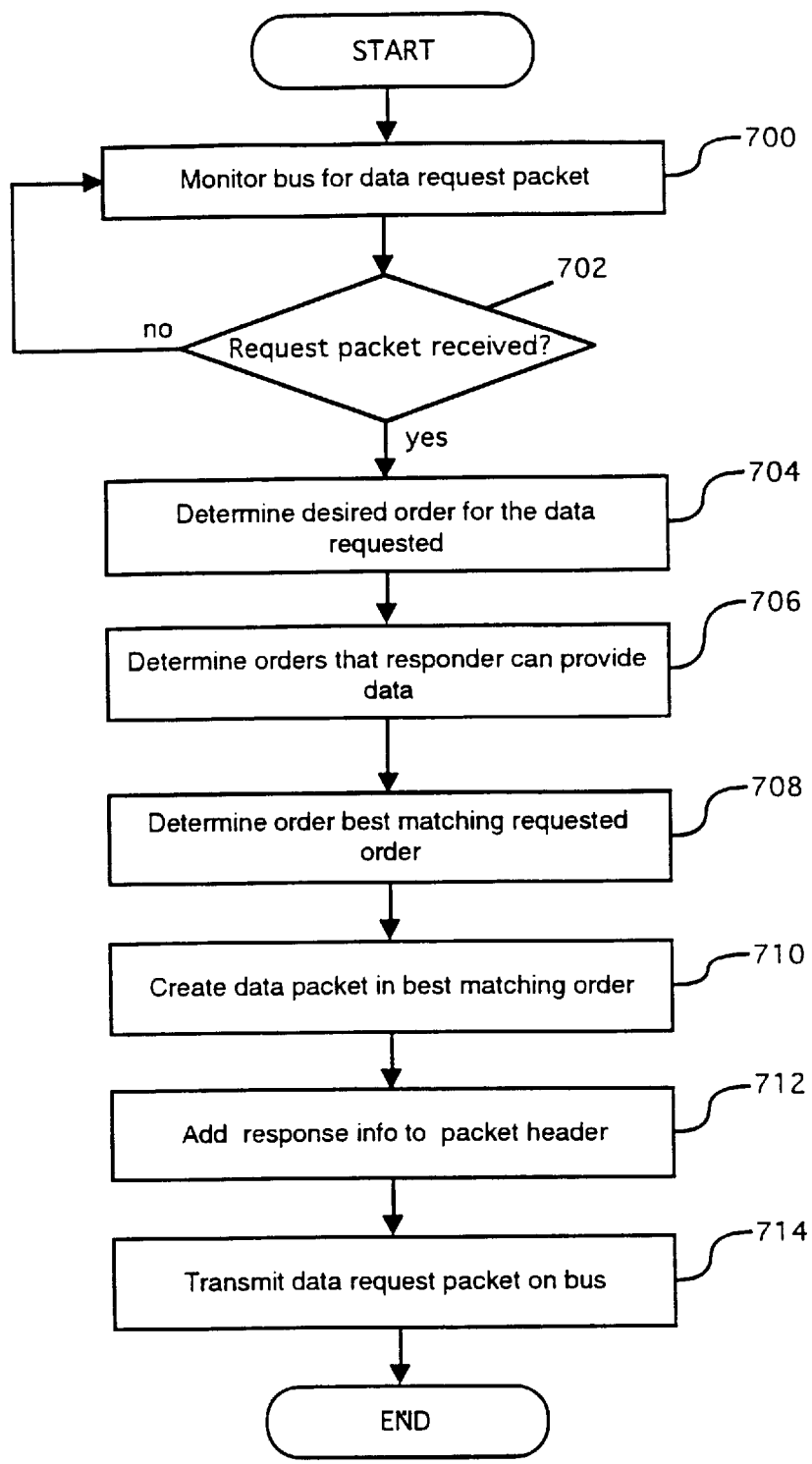
FIG. 7 is a flow chart of the steps for processing a request for critical-word-first data transfer.

Referring now to FIG. 7, a flow chart of a method for efficiently handling critical-word data transfers is shown. The method begins in step 700 where the memory controller 50 monitors the bus 22, 24 for a data request packet. Then in step 702, the method tests whether a data request packet has been received. If not, the method returns to step 700. Otherwise, the method continues in step 704. In step 704, the method determines the desired order specified in the data request packet in which the data is to be formatted. Next in step 706, the method determines the orders in which the memory controller 50 is able to process the data. Then in step 708, the method determines the order best matching the requested order in which the data can be formatted. Next in step 710, the data block 94 of the response packet is created by ordering the requested line of data in the order best matching the requested order. Then in step 712, the creation of the data response packet is completed by adding response information to the status field 92 and the dataOffset field 96. Finally in step 714, the method transmits the data response packet over the data bus.

Referring now to FIGS. 8A–8D, charts showing the exemplary data as stored in the data storage device and several of the corresponding data transfer responses created by different memory controllers constructed according to the present invention are shown.

FIG. 8A shows an exemplary data response packet 100 created by the third memory 40. For the purposes of the exemplary data response packet 100 of FIG. 8A, it is assumed that the memory line size is 64-bytes, the third memory 40 is capable of providing words 4-bytes in size; the data beat or bus width is 64 bits; a request for a critical-byte first data transfer has been sent to the third memory 40; and the critical byte has been identified in the request as byte 30. As shown in FIG. 8A, the memory controller 50 of the third memory 40 responds by creating the data response packet 100 with a header having the cmd, responder, tId, requester fields 72b, 91, 80b, and 93 completed using information from the data request. The status field 92 has a value indicating whether the data in the data block 94 is being returned or in the case of an error, could not be returned. The value stored in the offset field is "28" indicating that the first byte of the data block 94 is byte 28. Each line in the response packet 100 is transferred over the bus 22, 24 in a single data beat. Based on the value stored in the offset field 96, the requester can easily determine where in the data block 94 of the data response packet 100, the critical byte, byte 30, is located. Further, consistent with the requirements of the claimed invention, the critical byte, byte 30, is within the first word of the data response packet 100 since the first word includes bytes 28–31, the critical byte is the third byte of the first word.

Referring now to FIG. 8B, two exemplary response packets 100, 102 are shown as might be generated by the memory controller 50 and the bridge controller 60, respectively. For the two exemplary response packets 100, 102, it is assumed that a memory is responding to a data transfer request from a remote bus, such as a data transfer request from the first processor 12 to the second memory 28 in FIG. 1. It is also assumed that the bus connecting the memory and the bridge is 64 bits wide, while the bus connecting the bridge and the processor is only 32 bits wide. For the purposes of the exemplary data response packets 100, 102 of FIG. 8B, it is again assumed that the memory line size is 64-bytes, the second memory 28 is capable of providing words 4-bytes in size; a request for a critical-byte first data transfer has been sent to the second memory 28; and the critical byte has been identified in the request as byte 30. The first response packet 100 created by the memory controller is the same as has been described above in FIG. 8A. This response packet 100 is received by the bridge 60, and is reformatted by the bridge 60 to match the bus 22 between the bridge 60 and the first processor 12, which is assumed to be 32 bits wide. The bridge 60 constructed in accordance with the present invention advantageously stores the data in the data storage buffer 62 (FIFO buffer) and the outputs the data 32 bits at a time to match the data beat of bus 22. As shown, exemplary response packet 102 has a 32-bit portion including the cmd, responder, tId and requester fields 72b, 91, 80b, 93. The values stored in these fields are the same as was provided in the header of the response packet 100. A second 32-bit portion includes the status and data offset fields 92, 96. These fields likewise have the same values as the corresponding fields of response packet 100. Essentially, the bridge need only reformat the data into 32-bit portions to match the bus beat of bus 22. The remaining 32-bit portions are the 4-byte words of data for the memory line. This example shows how the quadlet or four-byte word format output by the memory controller even though at 64 bits at a time can be used down stream to provide further efficiencies for data transfers.

FIG. 8C shows an exemplary data response packet 104 created by the first memory 20. For the purposes of the exemplary data response packet 104 of FIG. 8B, it is again assumed that the memory line size is 64-bytes, the data beat is 64 bits, a request for a critical-byte first data transfer has been sent to the first memory 20; and the critical byte has been identified in the request as byte 30. However, the first memory 20 is assumed to be able to provide the data with words 8-bytes in size. As shown in FIG. 8C, the memory controller 50 of the first memory 20 responds by creating data response packet 104 with a header having the cmd, responder, tId, and requester fields 72b, 91, 80b, and 93 completed using information from the data request. The status field 92 has a value indicating whether the data in the data block 94 is being returned or in the case of an error, could not be returned. The value stored in the offset field is 24 indicating that the first byte of the data block 94 is byte 24 of the memory line 54. Based on the value stored in the offset field 96, the requester can easily determine where in the data block 94 of the data response packet 104, the critical byte, byte 30, is located. Moreover and again consistent with the requirements of the claimed invention, the critical byte, byte 30, is within the first word of the data response packet 104 since the first word includes bytes 24–31, the critical byte is the seventh byte of the first word.

FIG. 8D shows an exemplary data response packet 106 created by the second memory 28. For the purposes of the exemplary data response packet 106 of FIG. 8D, it is again assumed that the memory line size is 64-bytes, the data beat is 64 bits, a request for a critical-byte first data transfer has been sent to the second memory 28; and the critical byte has been identified in the request as byte 30. However, it is assumed to be most convenient for the second memory 20 to provide the data with words 16-bytes in size. As shown in FIG. 8D, the memory controller 50 of the second memory 28 responds by creating data response packet 106 with a header having the cmd, responder, tld, and requester fields 72*b,* 91, 80*b,* and 93 completed using information from the data request. The status field 92 has a value indicating whether the data in the data block 94 is being returned or in the case of an error, could not be returned. The value stored in the offset field is 16 indicating that the first byte of the data block 94 is byte 16 of the memory line 54. Based on the value stored in the offset field 96, the requester can easily determine where in the data block 94 of the data response packet 106, the critical byte, byte 30, is located. Again consistent with the requirements of the claimed invention, the critical byte, byte 30, is within the first word of the data response packet 106 since the first word includes bytes 16–31, the critical byte is the fifteenth byte of the first word.

While the present invention has been described with reference to certain preferred embodiments, those skilled in the art will recognize that various modifications may be provided. These and other variations upon and modifications to the preferred embodiments are provided for by the present invention, which is limited only by the following claims.

What is claimed is:

1. A system for generating and sending a critical-word-first data response packet in response to a critical-byte first data request, the system comprising:

a data storage device having a control input and a data output for outputting data in more than one word ordering; and a controller having a first input, a first output and a second output for receiving the data request and creating the response packet, the first input of the controller receiving the data request, the first output of the controller coupled to the control input of the data storage device, and the second output of the controller providing a header portion of the response packet identifying a critical-word-first order of the packet by specifying a first byte of a first word in the response packet;

wherein the controller comprises a state machine for processing data transfer requests by determining the orderings of data that the data storage device can provide; determining the ordering for the data requested; and creating the response packet with the data ordered in critical-word-aligned order beginning with the word containing the critical first byte.

2. The system of claim 1 wherein the controller further comprises:

a data selector having a data output for formatting data into a predetermined word size, the data selector coupled to the output of the data storage device to receive data, and coupled to the controller to receive control signals, and a multiplexer having a first data input and a second data input, for selectively outputting signals in response to a control signal from the controller, the first data input coupled to the data output of the data selector, and the second data input coupled to the controller to receive packet header data.

3. The system of claim 2, wherein the data selector is capable of organizing the data from the data storage device into one from the group of octet, hexlet or quadlet.

4. The system of claim 1, wherein the controller is a memory controller and the data storage device is static random access memory.

5. The system of claim 1, wherein the controller is a bridge controller and the data storage device is a first-in-first-out buffer.

6. A system for transferring data in critical-word-first order, the system comprising:

a requester having an input and an output for generating and sending a critical-byte first data request, wherein the requester is a state machine that creates a data request packet, transmits the data request packet, monitors for a response packet, receives a response packet including header information, and uses the header information to determine the order of data in the response packet; and a responder having an input and an output for receiving the data request, and generating and sending a critical-word-first data response packet, the input of the responder coupled to the output of the requester and the output of the responder coupled to the input of the requester;

wherein the responder includes a state machine for processing data transfer requests by determining the orderings of data that the responder can provide; determining the ordering for the data requested; and creating a response packet with the data ordered in critical-word-aligned order beginning with the word containing the critical first byte.

7. The system of claim 6, wherein the responder includes:

a data storage device having a control input and a data output; and a controller having a first input, a first output and a second output for receiving the data request and creating the response packets the first input of the controller coupled to the output of the requester to receive the data request, the first output of the controller coupled to the control input of the data output, and the second output of the controller coupled to the input of the requester to receive the response packet.

8. The system of claim 7 wherein the controller further comprises:

a data selector having a data output for formatting data into a predetermined word size, the data selector coupled to the output of the data storage device to receive data, and coupled to the controller to receive control signals, and a multiplexer having a first data input, a second data input, for selectively outputting signals in response to a control signal from the controller, the first data input coupled to the data output of the data selector, and the second data input coupled to the controller to receive packet header data.

9. A method for processing critical-byte-first data transfers, the method comprising the steps of:

monitoring for a data request packet;

determining a desired order for requested data;

determining orders in which a data storage device can provide the requested data;

determining an order of the data best matching the desired order;

creating a response packet having data ordered within the packet in the order best matching the desired order; and transmitting the response packet on a bus.

10. The method of claim 9 wherein the step of monitoring for a data request packet further comprises the steps of:

monitoring the bus for data request packets transmitted on the bus;

receiving data request packets transmitted on the bus including a header; and comparing data in the header of data request packets to a responder identification.

11. The method of claim 10 wherein the step of determining a desired order for requested data within the packet comprises the step of determining a desired first byte of data by retrieving an address value from the header of the data request packet.

12. The method of claim 9 wherein the step of determining an order of the data best matching the desired order comprises the step of comparing the orders in which a data storage device can provide the requested data to a first requested byte of data;

determining a word that includes the first requested byte of data; and setting the order best matching the desired order to be from the determined word to a last word in a memory line and from a first word in the memory line to a word preceding the determined word.

13. The method of claim 9 wherein the step of creating a response packet with the data ordered in the order best matching the desired order includes the step of adding response format information to the header of the response packet.

* * * * *